(12) United States Patent
Deng et al.

(10) Patent No.: US 10,321,395 B2
(45) Date of Patent: Jun. 11, 2019

(54) DATA PACKET PROCESSING METHOD AND RELATED DEVICE

(71) Applicant: Huawei Technologies Co., Ltd., Shenzhen (CN)

(72) Inventors: Yu Deng, Shanghai (CN); Shiying Xia, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/565,362

(22) PCT Filed: Apr. 10, 2015

(86) PCT No.: PCT/CN2015/076334
§ 371 (c)(1),
(2) Date: Oct. 9, 2017

(87) PCT Pub. No.: WO2016/161636
PCT Pub. Date: Oct. 13, 2016

(65) Prior Publication Data
US 2018/0063781 A1 Mar. 1, 2018

(51) Int. Cl.
*H04L 12/58* (2006.01)
*H04W 52/02* (2009.01)
*H04W 8/22* (2009.01)
*H04W 40/00* (2009.01)

(52) U.S. Cl.
CPC ......... *H04W 52/0209* (2013.01); *H04W 8/22* (2013.01); *H04W 40/005* (2013.01); *Y02D 70/126* (2018.01); *Y02D 70/1262* (2018.01)

(58) Field of Classification Search
None
See application file for complete search history.

(56) References Cited

U.S. PATENT DOCUMENTS

2007/0140270 A1* 6/2007 Hulkkonen ........... H04L 12/185
370/401
2007/0160064 A1* 7/2007 Kwon ................... H04W 80/04
370/395.52
(Continued)

FOREIGN PATENT DOCUMENTS

CN 101399717 A 4/2009
CN 101895986 A 11/2010
(Continued)

OTHER PUBLICATIONS

Machine Translation and Abstract of Chinese Publication No. CN101895986, Nov. 24, 2010, 25 pages.
(Continued)

*Primary Examiner* — Brandon M Renner
(74) *Attorney, Agent, or Firm* — Conley Rose, P.C.

(57) ABSTRACT

A data packet processing method and a related device are provided. The data packet processing method includes receiving, by a modem of a mobile terminal, an Internet Protocol IP data packet from a network; determining an online status of a data service of the mobile terminal; and processing, by the modem, the IP data packet according to a transfer protocol type of the IP data packet if it is determined that the data service of the mobile terminal is not in an online state, where the modem does not forward the IP data packet to an application processor of the mobile terminal if it is determined that the data service of the mobile terminal is not in the online state. Technical solutions provided in embodiments of the present disclosure help reduce standby power consumption of a mobile terminal, thereby improving product experience of users.

18 Claims, 6 Drawing Sheets

(56) References Cited

U.S. PATENT DOCUMENTS

| | | | | |
|---|---|---|---|---|
| 2009/0232097 | A1* | 9/2009 | Taneja | H04W 36/02 370/331 |
| 2010/0290463 | A1 | 11/2010 | Yao et al. | |
| 2011/0110332 | A1* | 5/2011 | Kim | H04W 36/0016 370/331 |
| 2013/0244590 | A1* | 9/2013 | Nukala | H04W 80/06 455/77 |
| 2014/0029496 | A1* | 1/2014 | Ise | H04W 52/0225 370/311 |
| 2014/0089442 | A1* | 3/2014 | Kim | H04L 51/38 709/206 |
| 2014/0090047 | A1* | 3/2014 | Yuan | H04L 63/0263 726/13 |
| 2016/0080529 | A1* | 3/2016 | Lin | H04L 67/02 709/203 |

FOREIGN PATENT DOCUMENTS

| | | |
|---|---|---|
| CN | 102752722 A | 10/2012 |
| EP | 2378799 A1 | 10/2011 |

OTHER PUBLICATIONS

Machine Translation and Abstract of Chinese Publication No. CN102752722, Oct. 24, 2012, 34 pages.

Foreign Communication From a Counterpart Application, PCT Application No. PCT/CN2015/076334, English Translation of International Search Report dated Jan. 13, 2016, 2 pages.

Foreign Communication From a Counterpart Application, PCT Application No. PCT/CN2015/076334, English Translation of Written Opinion dated Jan. 13, 2016, 5 pages.

* cited by examiner

DATA PACKET PROCESSING METHOD AND RELATED DEVICE

CROSS-REFERENCE TO RELATED APPLICATIONS

This application is a National Stage of International Application No. PCT/CN2015/076334, filed on Apr. 10, 2015, which is hereby incorporated by reference in its entirety.

TECHNICAL FIELD

The present disclosure relates to the field of communications technologies, and specifically relates to a data packet processing method and a related device.

BACKGROUND

Current 4G network technologies are constructed based on an access mode of a Long Term Evolution (LTE) standard. The 4G network technologies bring low-delay and high-Internet-speed experience. However, due to factors such as a network topology structure, a coverage rate, and an always-on characteristic, a mobile terminal supporting the LTE standard is not good in aspects of power consumption experience during data transmission and being standby, and this prevents the 4G network technologies from being widely applied in some degree.

A relatively prominent problem at present is a problem that an Internet Protocol (IP) data packet of an LTE network affects standby power consumption of a mobile terminal. For example, an LTE network, different from a 3G network that has an always-on characteristic, does not deactivate a packet data protocol (PDP) context of a mobile terminal after a data service is disconnected but deactivates only an evolved packet system (EPS) bearer of the mobile terminal. Therefore, the mobile terminal on a network always has an IP address as an identification thereof.

If the mobile terminal on the network always has an IP address as an identification thereof, after a data service of the mobile terminal is disconnected (that the data service is disconnected is that the data service is not in an online state), a modem of the mobile terminal still may receive a large quantity of IP data packets from the network. In some approaches, a modem of a mobile terminal directly forwards any received IP data packet to an application processor of the mobile terminal. Consequently, after a data service is disconnected, the application processor of the mobile terminal may still be awakened frequently for no reason, and this causes a large quantity of electricity of the mobile terminal to be consumed for no reason, further affecting product experience of users.

SUMMARY

Embodiments of the present disclosure provide a data packet processing method and a related device, to reduce standby power consumption of a mobile terminal, so as to improve product experience of users.

A first aspect of the present disclosure provides a data packet processing method, including receiving, by a modem of a mobile terminal, an Internet Protocol IP data packet from a network; determining an online status of a data service of the mobile terminal; and processing, by the modem, the IP data packet according to a transfer protocol type of the IP data packet if it is determined that the data service of the mobile terminal is not in an online state, where the modem does not forward the IP data packet to an application processor of the mobile terminal if it is determined that the data service of the mobile terminal is not in the online state.

With reference to the first aspect, in a first possible implementation manner of the first aspect, the method further includes detecting, by the modem, whether a destination IP address of the IP data packet is the same as one of local IP addresses of the mobile terminal if it is determined that the data service of the mobile terminal is in the online state; and processing, by the modem, the IP data packet according to the transfer protocol type of the IP data packet if it is detected that the destination IP address of the IP data packet is different from any one of the local IP addresses of the mobile terminal, where the modem does not forward the IP data packet to the application processor of the mobile terminal if it is detected that the destination IP address of the IP data packet is different from any one of the local IP addresses of the mobile terminal.

With reference to the first possible implementation manner of the first aspect, in a second possible implementation manner of the first aspect, the method further includes forwarding, by the modem, the IP data packet to the application processor of the mobile terminal if it is detected that the destination IP address of the IP data packet is the same as one of the local IP addresses of the mobile terminal.

With reference to the first aspect, the first possible implementation manner of the first aspect, or the second possible implementation manner of the first aspect, in a third possible implementation manner of the first aspect, the processing, by the modem, the IP data packet according to a transfer protocol type of the IP data packet includes sending, by the modem, a reset data packet in response to the IP data packet to the network if the transfer protocol type of the IP data packet is a Transmission Control Protocol (TCP).

With reference to the third possible implementation manner of the first aspect, in a fourth possible implementation manner of the first aspect, the sending, by the modem, a reset data packet in response to the IP data packet includes using, by the modem, the destination IP address of the IP data packet as an IP address of a virtual network interface card in the modem, where a port list of the virtual network interface card does not include a port record matching the destination IP address, and inputting, by the modem, the IP data packet to a TCP/IP protocol stack of the virtual network interface card, to trigger the protocol stack of the virtual network interface card to send, after receiving the IP data packet, the reset data packet in response to the IP data packet to the network.

With reference to the fourth possible implementation manner of the first aspect, in a fifth possible implementation manner of the first aspect, the port list of the virtual network interface card is an empty port list.

With reference to the first aspect, the first possible implementation manner of the first aspect, or the second possible implementation manner of the first aspect, in a sixth possible implementation manner of the first aspect, the processing, by the modem, the IP data packet according to a transfer protocol type of the IP data packet includes discarding, by the modem, the IP data packet if the transfer protocol type of the IP data packet is a user datagram protocol UDP.

With reference to the first aspect, the first possible implementation manner of the first aspect, or the second possible implementation manner of the first aspect, in a seventh possible implementation manner of the first aspect, the processing, by the modem, the IP data packet according to a transfer protocol type of the IP data packet includes sending, by the modem, an answer data packet of the IP data packet to the network if the transfer protocol type of the IP data packet is an Internet Control Message Protocol ICMP.

With reference to any one of the first aspect, or the first to the seventh possible implementation manners of the first aspect, in an eighth possible implementation manner of the first aspect, the method further includes if it is determined that the data service of the mobile terminal is not in the online state, controlling, by the modem, the mobile terminal to enter a standby state after processing the IP data packet according to the transfer protocol type of the IP data packet.

With reference to any one of the first aspect, or the first to the eighth possible implementation manners of the first aspect, in a ninth possible implementation manner of the first aspect, the mobile terminal is a mobile terminal supporting a Long Term Evolution LTE standard.

A second aspect of the present disclosure provides a modem of a mobile terminal, including a receiving unit configured to receive an Internet Protocol IP data packet; a determining unit configured to determine an online status of a data service of the mobile terminal; and a processing unit configured to process the IP data packet according to a transfer protocol type of the IP data packet if it is determined that the data service of the mobile terminal is not in an online state, where the processing unit does not forward the IP data packet to an application processor of the mobile terminal if the data service of the mobile terminal is not in the online state.

With reference to the second aspect, in a first possible implementation manner of the second aspect, the processing unit is further configured to detect whether a destination IP address of the IP data packet is the same as one of local IP addresses of the mobile terminal if it is determined that the data service of the mobile terminal is in the online state; and process the IP data packet according to the transfer protocol type of the IP data packet if it is detected that the destination IP address of the IP data packet is different from any one of the local IP addresses of the mobile terminal, where the processing unit does not forward the IP data packet to the application processor of the mobile terminal if it is detected that the destination IP address of the IP data packet is different from any one of the local IP addresses of the mobile terminal.

With reference to the first possible implementation manner of the second aspect, in a second possible implementation manner of the second aspect, the processing unit is further configured to forward the IP data packet to the application processor of the mobile terminal if it is detected that the destination IP address of the IP data packet is the same as one of the local IP addresses of the mobile terminal.

With reference to the second aspect, the first possible implementation manner of the second aspect, or the second possible implementation manner of the second aspect, in a third possible implementation manner of the second aspect, in terms of processing the IP data packet according to the transfer protocol type of the IP data packet, the processing unit is configured to send a reset data packet in response to the IP data packet to a network if the transfer protocol type of the IP data packet is a Transmission Control Protocol TCP.

With reference to the third possible implementation manner of the second aspect, in a fourth possible implementation manner of the second aspect, in terms of sending the reset data packet in response to the IP data packet to the network, the processing unit is configured to use the destination IP address of the IP data packet as an IP address of a virtual network interface card in the modem, where a port list of the virtual network interface card does not include a port record matching the destination IP address; and input the IP data packet to a TCP/IP protocol stack of the virtual network interface card, to trigger the protocol stack of the virtual network interface card to send, after receiving the IP data packet, the reset data packet in response to the IP data packet to the network.

With reference to the third possible implementation manner of the second aspect, in a fourth possible implementation manner of the second aspect, the port list of the virtual network interface card is an empty port list.

With reference to the second aspect, the first possible implementation manner of the second aspect, or the second possible implementation manner of the second aspect, in a sixth possible implementation manner of the second aspect, in terms of processing the IP data packet according to the transfer protocol type of the IP data packet, the processing unit is configured to discard, by the modem, the IP data packet if the transfer protocol type of the IP data packet is a user datagram protocol UDP.

With reference to the second aspect, the first possible implementation manner of the second aspect, or the second possible implementation manner of the second aspect, in a seventh possible implementation manner of the second aspect, in terms of processing the IP data packet according to the transfer protocol type of the IP data packet, the processing unit is configured to send an answer data packet of the IP data packet to a network if the transfer protocol type of the IP data packet is an Internet Control Message Protocol ICMP.

A third aspect of the present disclosure provides a mobile terminal, including a modem and an application processor, where the modem is configured to receive an Internet Protocol IP data packet from a network; determine an online status of a data service of the mobile terminal; and process the IP data packet according to a transfer protocol type of the IP data packet if it is determined that the data service of the mobile terminal is not in an online state, where the modem does not forward the IP data packet to the application processor if it is determined that the data service of the mobile terminal is not in the online state.

With reference to the third aspect, in a first possible implementation manner of the third aspect, the modem is further configured to detect whether a destination IP address of the IP data packet is the same as one of local IP addresses of the mobile terminal if it is determined that the data service of the mobile terminal is in the online state; and process the IP data packet according to the transfer protocol type of the IP data packet if it is detected that the destination IP address of the IP data packet is different from any one of the local IP addresses of the mobile terminal, where the modem does not forward the IP data packet to the application processor of the mobile terminal if it is detected that the destination IP address of the IP data packet is different from any one of the local IP addresses of the mobile terminal.

With reference to the first possible implementation manner of the third aspect, in a second possible implementation manner of the third aspect, the modem is further configured to forward the IP data packet to the application processor of the mobile terminal if it is detected that the destination IP address of the IP data packet is the same as one of the local IP addresses of the mobile terminal.

With reference to the third aspect, the first possible implementation manner of the third aspect, or the second possible implementation manner of the third aspect, in a third possible implementation manner of the third aspect, in terms of processing the IP data packet according to the transfer protocol type of the IP data packet, the modem is configured to send a reset data packet in response to the IP data packet to the network if the transfer protocol type of the IP data packet is a Transmission Control Protocol TCP.

With reference to the third aspect, the first possible implementation manner of the third aspect, or the second possible implementation manner of the third aspect, in a fourth possible implementation manner of the third aspect, in terms of processing the IP data packet according to the transfer protocol type of the IP data packet, the modem is configured to discard the IP data packet if the transfer protocol type of the IP data packet is a user datagram protocol UDP.

With reference to the third aspect, the first possible implementation manner of the third aspect, or the second possible implementation manner of the third aspect, in a fifth possible implementation manner of the third aspect, in terms of processing the IP data packet according to the transfer protocol type of the IP data packet, the modem is configured to send an answer data packet of the IP data packet to the network if the transfer protocol type of the IP data packet is an Internet Control Message Protocol ICMP.

With reference to any one of the third aspect, or the first to the fifth possible implementation manners of the third aspect, in a sixth possible implementation manner of the third aspect, the modem is further configured to if it is determined that the data service of the mobile terminal is not in the online state, control the mobile terminal to enter a standby state after processing the IP data packet according to the transfer protocol type of the IP data packet.

With reference to any one of the third aspect, or the first to the sixth possible implementation manners of the third aspect, in a seventh possible implementation manner of the third aspect, the mobile terminal is a mobile terminal supporting a Long Term Evolution LTE standard.

It can be learned that in technical solutions provided in some embodiments of the present disclosure, when receiving an Internet Protocol IP data packet from a network, a modem of a mobile terminal determines an online status of a data service of the mobile terminal. If it is determined that the data service of the mobile terminal is not in an online state, the modem processes the IP data packet according to a transfer protocol type of the IP data packet. Besides, because if it is determined that the data service of the mobile terminal is not in the online state, the modem does not forward the IP data packet to an application processor of the mobile terminal, some IP data packets invalid for the application processor can be blocked by the modem. This can greatly reduce a probability that the application processor of the mobile terminal is awakened for no reason after the data service is disconnected, and helps greatly reduce processing of invalid IP data packets (which may also be referred to as rubbish IP data packets) by the application processor, thereby helping reduce standby power consumption of the mobile terminal and further improving product experience of users.

BRIEF DESCRIPTION OF DRAWINGS

To describe the technical solutions in the embodiments of the present disclosure more clearly, the following briefly describes the accompanying drawings for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Embodiments of the present disclosure provide a data packet processing method and a related device, to reduce standby power consumption of a mobile terminal, so as to improve product experience of users.

To make the disclosure objectives, features, and advantages of the present disclosure clearer and more comprehensible, the following clearly describes the technical solutions in the embodiments of the present disclosure with reference to the accompanying drawings in the embodiments of the present disclosure. The embodiments described in the following are merely a part rather than all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between different objects but do not indicate a particular order. In addition, the terms "including", "containing", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1A:
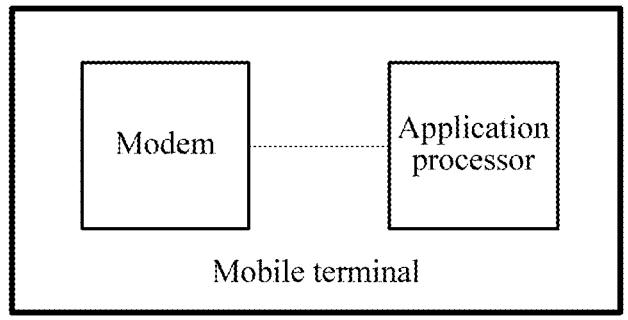
FIG. 1A is a schematic diagram of an architecture of a mobile terminal according to an embodiment of the present disclosure.

The present disclosure first provides a schematic structural diagram of a mobile terminal. The mobile terminal illustrated in FIG. 1A mainly includes a modem and an application processor. The modem can be considered as a conversion interface that enables digital data to be transmitted on analog signal transmission line. In this embodiment of the present disclosure, a modem refers to a mobile communications modem or a mobile communications modem device, and the modem is a part of a mobile terminal. An application processor in this embodiment of the present disclosure refers to a processor used for running an operating system, a user interface, and an application program of a mobile terminal.

Figure 1B:
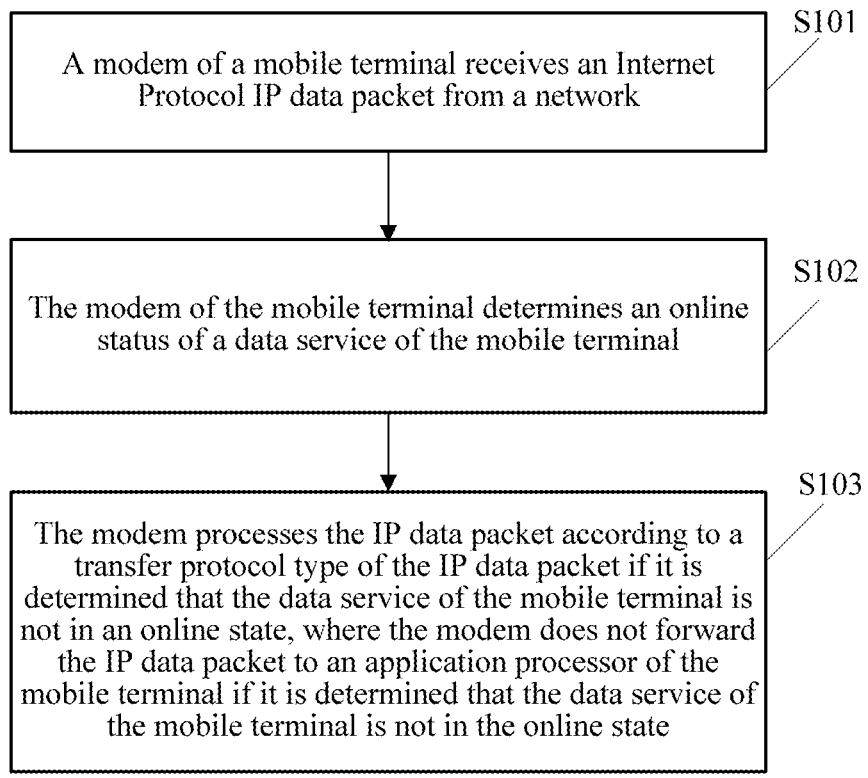
FIG. 1B is a schematic flowchart of a data packet processing method according to an embodiment of the present disclosure.

Referring to FIG. 1B, FIG. 1B is a schematic flowchart of a data packet processing method according to an embodiment of the present disclosure. As illustrated in FIG. 1B, a data packet processing method provided by one embodiment of the present disclosure may include the following.

S101, A modem of a mobile terminal receives an Internet Protocol IP data packet from a network.

The mobile terminal in this embodiment of the present disclosure may be a mobile terminal supporting an LTE standard or may be a mobile terminal supporting another 4G network standard or a later-released network standard.

The mobile terminal in this embodiment of the present disclosure may be, for example, a cell phone (such as a smart phone), a tablet computer, or another mobile terminal.

S102, The modem of the mobile terminal determines an online status of a data service of the mobile terminal.

The online status of the data service of the mobile terminal may be that the data service of the mobile terminal is in an online state (that is, the data service of the mobile terminal is connected), or the online status of the data service of the mobile terminal may be that the data service of the mobile terminal is not in an online state (that is, the data service of the mobile terminal is disconnected).

S103, The modem processes the IP data packet according to a transfer protocol type of the IP data packet if it is determined that the data service of the mobile terminal is not in an online state, where the modem does not forward the IP data packet to an application processor of the mobile terminal if it is determined that the data service of the mobile terminal is not in the online state.

For example, if it is determined that the data service of the mobile terminal is not in the online state, the modem responds to or discards the IP data packet according to the transfer protocol type of the IP data packet.

It can be learned that in the technical solution of this embodiment, when receiving an Internet Protocol IP data packet from a network, a modem of a mobile terminal determines an online status of a data service of the mobile terminal. If it is determined that the data service of the mobile terminal is not in an online state, the modem processes the IP data packet according to a transfer protocol type of the IP data packet. Besides, because if it is determined that the data service of the mobile terminal is not in the online state, the modem does not forward the IP data packet to an application processor of the mobile terminal, some IP data packets invalid for the application processor can be blocked by the modem. This can greatly reduce a probability that the application processor of the mobile terminal is awakened for no reason after the data service is disconnected, and helps greatly reduce processing of invalid IP data packets (which may also be referred to as rubbish IP data packets) by the application processor, thereby helping reduce standby power consumption of the mobile terminal and further improving product experience of users.

The modem may determine the online status of the data service of the mobile terminal in various manners. For example, if a PDP context of the mobile terminal is in an activated state and the mobile terminal has an EPS Bearer, it can be determined that the data service of the mobile terminal is in the online state, and if the mobile terminal does not have an EPS Bearer, it can be determined that the data service of the mobile terminal is not in the online state.

Optionally, in some possible implementation manners of the present disclosure, further, if the modem of the mobile terminal determines that the data service of the mobile terminal is in the online state, the modem may detect whether a destination IP address of the IP data packet is the same as one of local IP addresses of the mobile terminal. The modem processes the IP data packet according to the transfer protocol type of the IP data packet if it is detected that the destination IP address of the IP data packet is different from any one of the local IP addresses of the mobile terminal. The modem does not forward the IP data packet to the application processor of the mobile terminal if it is detected that the destination IP address of the IP data packet is different from any one of the local IP addresses of the mobile terminal.

Researches and practices show that if it is detected that the destination IP address of the IP data packet is different from any one of the local IP addresses of the mobile terminal, generally, it can be considered that the IP data packet may be invalid for the application processor of the mobile terminal. Therefore, if it is detected that the destination IP address of the IP data packet is different from any one of the local IP addresses of the mobile terminal, the modem does not forward the IP data packet to the application processor of the mobile terminal, but the modem processes the IP data packet according to the transfer protocol type of the IP data packet, so that some IP data packets invalid for the application processor can be blocked by the modem. This helps reduce processing of invalid IP data packets by the application processor of the mobile terminal if the data service is connected, thereby helping reduce standby power consumption of the mobile terminal and further improving product experience of users.

Optionally, in some possible implementation manners of the present disclosure, the modem may forward the IP data packet to the application processor of the mobile terminal if it is detected that the destination IP address of the IP data packet is the same as one of the local IP addresses of the mobile terminal. If the data service of the mobile terminal is in the online state, if it is detected that the destination IP address of the IP data packet is the same as any one of the local IP addresses of the mobile terminal, it can be generally considered that the IP data packet may be valid for the application processor of the mobile terminal. One mobile terminal may have multiple local IP addresses. For example, a mobile terminal voice service, a multimedia messaging service, and a data service may correspond to different local IP addresses.

Optionally, in some possible implementation manners of the present disclosure, if it is determined that the data service of the mobile terminal is not in the online state, the modem controls the mobile terminal to enter a standby state after processing the IP data packet according to the transfer protocol type of the IP data packet. If the data service of the mobile terminal is not in the online state, the mobile terminal is triggered by a rubbish packet (the IP data packet) to enter a connected state, and in this case, the mobile terminal may be controlled to enter a standby state without waiting for network timeout. This also helps further reduce standby power consumption of the mobile terminal.

The modem may process the IP data packet according to the transfer protocol type of the IP data packet in various manners. For example, according to different transfer protocol types of the IP data packet, the modem may process the IP data packet in different manners.

For example, that the modem processes the IP data packet according to the transfer protocol type of the IP data packet may include, for example the modem may discard the IP data packet if the transfer protocol type of the IP data packet is a user datagram protocol (UDP).

For another example, that the modem processes the IP data packet according to the transfer protocol type of the IP data packet may include, for example, the modem sends an answer data packet of the IP data packet to the network if the transfer protocol type of the IP data packet is an Internet Control Message Protocol (ICMP). The ICMP data packet is generally a PING packet used by a server to detect whether an IP address is valid.

For still another example, that the modem processes the IP data packet according to the transfer protocol type of the IP data packet may include the modem may send a reset (RST) data packet in response to the IP data packet to the network if the transfer protocol type of the IP data packet is a TCP. For example, if the IP data packet is from a server of the network, the modem may send a reset data packet in response to the IP data packet to the server in the network. After receiving the reset data packet, the server may interrupt a Socket connection between the server and the mobile terminal. After interrupting the Socket connection, the server no longer delivers the IP data packet to the mobile terminal. This helps save network resources and also helps reduce standby power consumption of the mobile terminal.

For example, that the modem sends a reset data packet in response to the IP data packet may include the modem uses the destination IP address of the IP data packet as an IP address of a virtual network interface card in the modem (for example, the modem may modify the IP address of the virtual network interface card in the modem, so that the modified IP address of the virtual network interface card in the modem is the same as the destination IP address of the IP data packet), where a port list of the virtual network interface card does not include a port record matching the destination IP address (for example, the port list of the virtual network interface card may be an empty port list); and the modem inputs the IP data packet to a TCP/IP protocol stack of the virtual network interface card, to trigger the protocol stack of the virtual network interface card to send, after receiving the IP data packet, the reset data packet in response to the IP data packet to the network. If the port list of the virtual network interface card does not include the port record matching the destination IP address, after receiving the IP data packet, the TCP/IP protocol stack of the virtual network interface card sends the reset data packet in response to the IP data packet to the network. Introducing the virtual network interface card may be considered as a mirror Socket implementation mechanism. The port list of the virtual network interface card is skillfully configured so that the port list of the virtual network interface card does not include the port record matching the destination IP address, and this can trigger the TCP/IP protocol stack of the virtual network interface card to initiatively send, after receiving the IP data packet, the reset data packet in response to the IP data packet to the network, so that repeated retransmission of a TCP data packet by the server due to no response to the server can be desirably avoided, thereby helping avoid a situation in which the mobile terminal is awakened repeatedly.

To better understand and implement the foregoing solution of this embodiment of the present disclosure, a further description is provided below with reference to an application scenario.

Figure 2A:
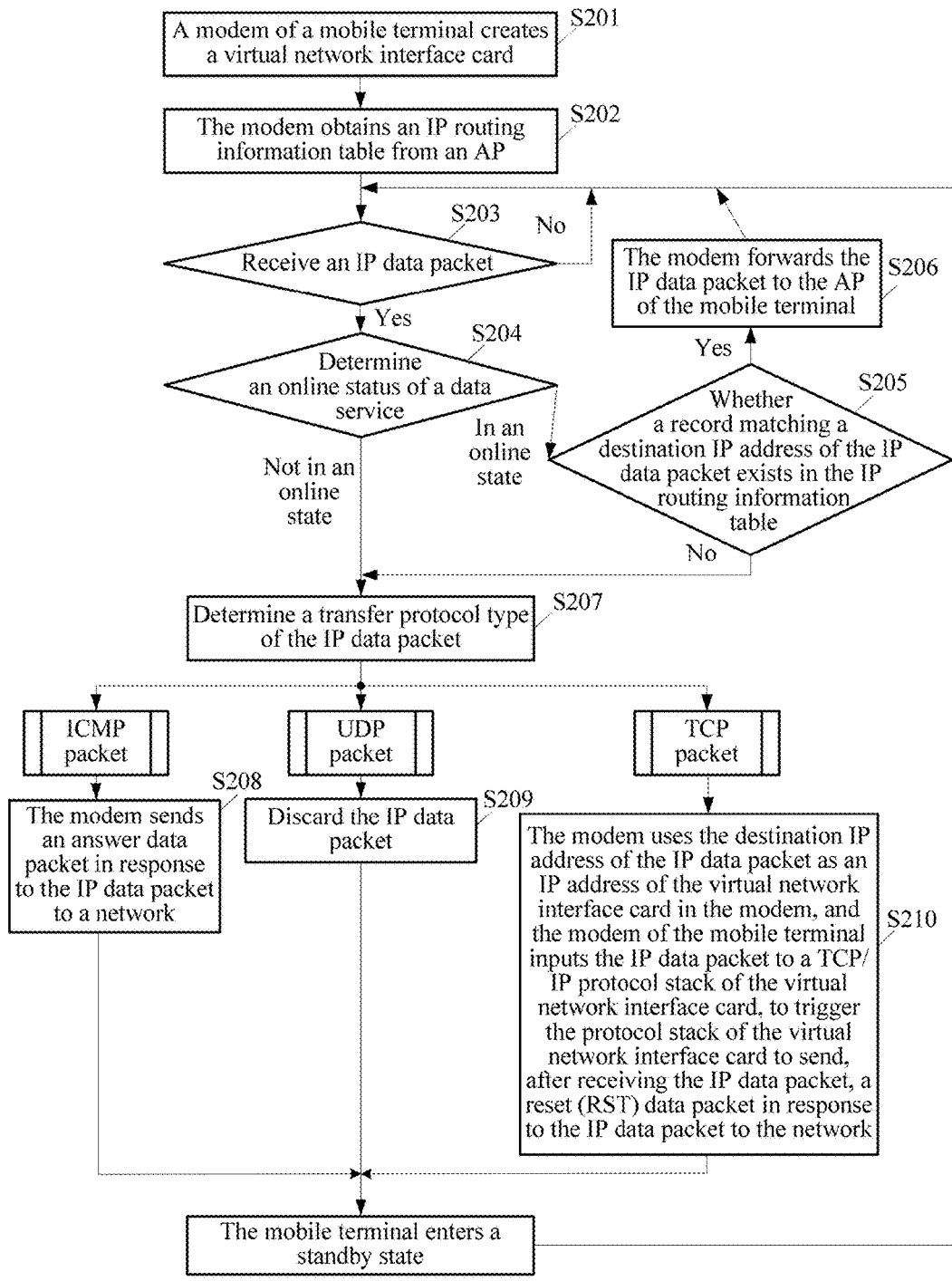
FIG. 2A is a schematic flowchart of another data packet processing method according to an embodiment of the present disclosure.
Figure 2B:
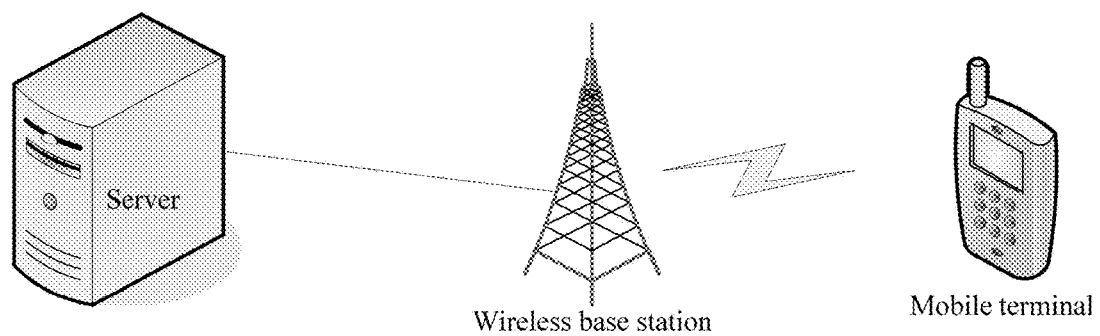
FIG. 2B and FIG. 2C are schematic diagrams of two network deployment architectures according to an embodiment of the present disclosure.
Figure 2C:
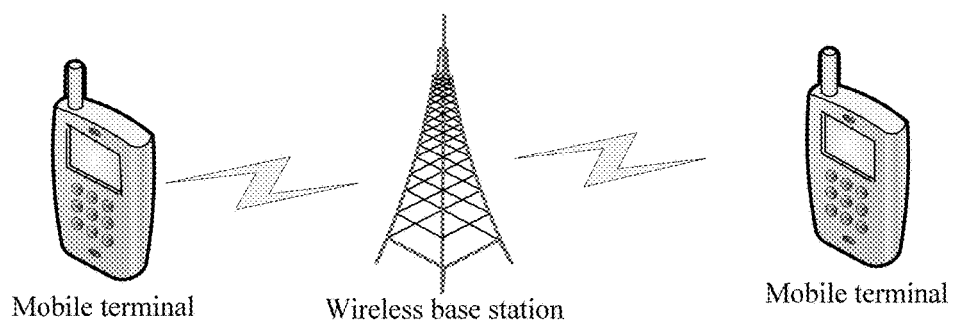

Referring to FIG. 2A to FIG. 2D, FIG. 2A is a schematic flowchart of another data packet processing method according to another embodiment of the present disclosure. FIG. 2B and FIG. 2C are schematic diagrams of two network deployment architectures according to an embodiment of the present disclosure.

As illustrated in FIG. 2A, another data packet processing method provided by another embodiment of the present disclosure may include the following.

S201, A modem of a mobile terminal creates a virtual network interface card.

A PORT list of the virtual network interface card may be an empty PORT list, and an initial IP address of the virtual network interface card is an invalid IP address (for example, an initial IP address of the virtual network interface card is "0, 0, 0, 0").

S202, The modem of the mobile terminal obtains an IP routing information table from an access point (AP), where the IP routing information table includes some or all local IP addresses of the mobile terminal.

S203, The modem of the mobile terminal receives an IP data packet from a network.

For example, in the network architecture shown in FIG. 2B, the modem of the mobile terminal may receive an IP data packet from a server of a network. For example, in the network architecture shown in FIG. 2C, the modem of the mobile terminal may receive an IP data packet from another mobile terminal.

S204, The modem of the mobile terminal determines an online status of a data service of the mobile terminal.

Step S205 is performed if it is determined that the data service of the mobile terminal is in an online state.

Step S207 is performed if it is determined that the data service of the mobile terminal is not in the online state.

For example, if a PDP context of the mobile terminal is in an activated state and the mobile terminal has an EPS Bearer, it is considered that the data service of the mobile terminal is in the online state, and if the mobile terminal does not have an EPS Bearer, it can be considered that the data service of the mobile terminal is not in the online state.

S205, The modem of the mobile terminal searches the IP routing information table to determine whether a record matching a destination IP address of the received IP data packet exists (that is, whether the destination IP address of the IP data packet is the same as one of local IP addresses of the mobile terminal).

If yes, step S206 is performed.

If no, step S207 is performed.

S206, The modem of the mobile terminal forwards the IP data packet to the AP of the mobile terminal.

If a record matching the destination IP address of the received IP data packet is found in the IP routing information table (that is, the destination IP address of the IP data packet is the same as one of the local IP addresses of the mobile terminal), it can be considered that the IP data packet is a normal data service flow.

If no record matching the destination IP address of the received IP data packet is found in the IP routing information table (that is, the destination IP address of the IP data packet is different from any one of local IP addresses of the mobile terminal), it can be considered that the IP data packet may be an abnormal data service flow.

S207, The modem of the mobile terminal determines a transfer protocol type of the IP data packet.

Step S208 is performed if it is determined that the transfer protocol type of the IP data packet is an ICMP.

Step S209 is performed if it is determined that the transfer protocol type of the IP data packet is a UDP.

Step S210 is performed if it is determined that the transfer protocol type of the IP data packet is a TCP.

S208, The modem of the mobile terminal sends an answer data packet in response to the IP data packet to the network.

S209, The modem of the mobile terminal discards the IP data packet.

S210, The modem of the mobile terminal uses the destination IP address of the IP data packet as an IP address of the virtual network interface card in the modem (for example, the modem of the mobile terminal may modify the IP address of the virtual network interface card in the modem, so that the modified IP address of the virtual network interface card in the modem is the same as the destination IP address of the IP data packet), where because a port list of the virtual network interface card may be an empty port list, the port list of the virtual network interface card does not include a port record matching the destination IP address of the IP data packet.

The modem of the mobile terminal inputs the IP data packet to a TCP/IP protocol stack of the virtual network interface card, to trigger the protocol stack of the virtual network interface card to send, after receiving the IP data packet, a RST data packet in response to the IP data packet to the network. If the port list of the virtual network interface card does not include the port record matching the destination IP address, after receiving the IP data packet, the TCP/IP protocol stack of the virtual network interface card sends the RST data packet in response to the IP data packet to the network.

Introducing the virtual network interface card may be considered as a mirror Socket implementation mechanism. The port list of the virtual network interface card is skillfully configured so that the port list of the virtual network interface card does not include the port record matching the destination IP address, and this can trigger the TCP/IP protocol stack of the virtual network interface card to initiatively send, after receiving the IP data packet, the reset data packet in response to the IP data packet to the network, so that repeated retransmission of a TCP data packet by the server due to no response to the server can be desirably avoided, thereby helping avoid a situation in which the mobile terminal is awakened repeatedly.

Optionally, in some possible implementation manners of the present disclosure, if it is determined that the data service of the mobile terminal is not in the online state, the modem controls the mobile terminal to enter a standby state after processing the IP data packet according to the transfer protocol type of the IP data packet. If the data service of the mobile terminal is not in the online state, the mobile terminal is triggered by a rubbish packet (the IP data packet) to enter a connected state, and in this case, the mobile terminal may be controlled to enter a standby state without waiting for network timeout. This also helps further reduce standby power consumption of the mobile terminal.

Figure 2D:
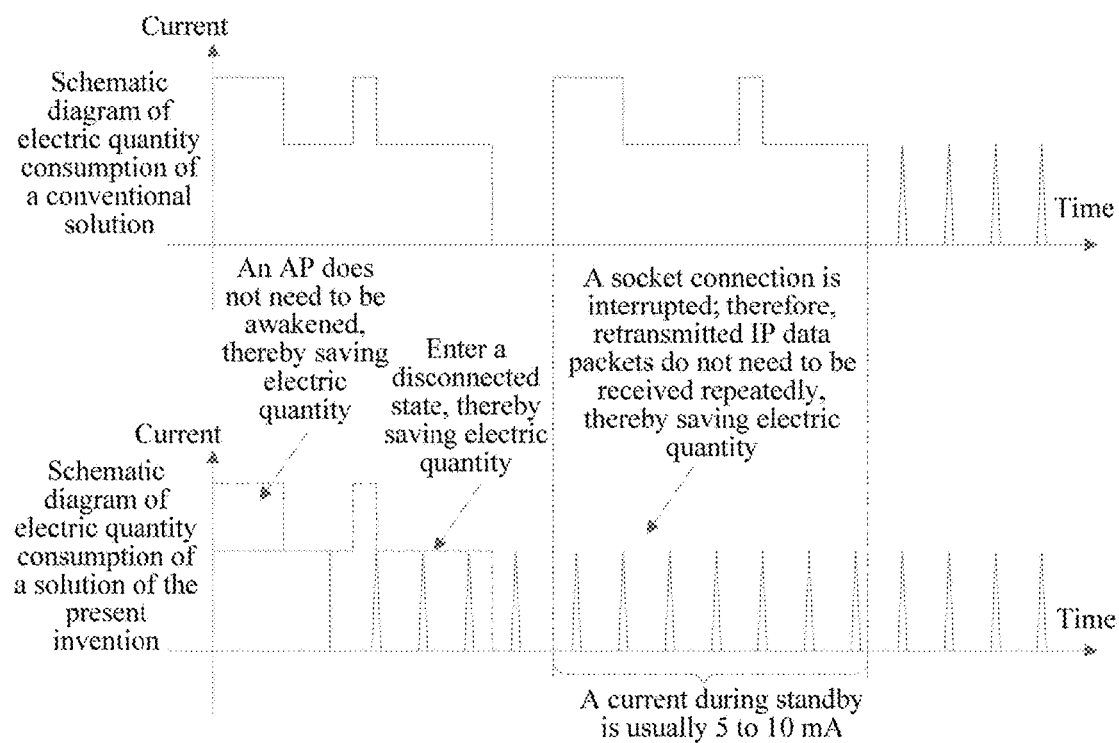
FIG. 2D is a schematic diagram of a comparison between electric quantity consumption according to an embodiment of the present disclosure.

Referring to FIG. 2D, FIG. 2D illustrates an energy saving effect of the solution of this embodiment compared with a conventional solution. In the conventional solution, a modem directly transparently transmits an invalid IP data packet to an AP, causing the AP to be awakened; however, the AP cannot process the IP data packet. Consequently, the IP data packet wastes electric quantity for no reason. In an LTE standard, each time a modem interacts with a network, the modem needs to enter a CONNECTED high-power-consumption state (of which the power consumption is 15 to 25 times common standby power consumption). Duration of the state may be 10 to 30 s. In the conventional solution, the modem cannot enter a DISCONNECTED state because of a useless IP data packet. In the conventional solution, because the AP does not process an IP data packet, if the IP data packet is a TCP packet, a server does not receive a response and may consider that a mobile terminal does not receive the packet, and retransmission is performed 3 to 15 times, imperceptibly increasing a quantity of rubbish packets and further increasing standby power consumption. After measurement on the conventional solution, it is found that the standby power consumption of the mobile terminal may be increased from theoretical 5 to 15 mA to 30 to 50 mA, severely affecting user experience. By implementing the solution of this embodiment, power consumption of the mobile terminal can be greatly reduced, and user experience can be greatly improved.

It can be learned that in the technical solution of this embodiment, when receiving an Internet Protocol IP data packet from a network, a modem of a mobile terminal determines an online status of a data service of the mobile terminal. If it is determined that the data service of the mobile terminal is not in an online state, the modem processes the IP data packet according to a transfer protocol type of the IP data packet. Besides, because if it is determined that the data service of the mobile terminal is not in the online state, the modem does not forward the IP data packet to an application processor of the mobile terminal, some IP data packets invalid for the application processor can be blocked by the modem. This can greatly reduce a probability that the application processor of the mobile terminal is awakened for no reason after the data service is disconnected, and helps greatly reduce processing of invalid IP data packets by the application processor, thereby helping reduce standby power consumption of the mobile terminal and further improving product experience of users.

Figure 3:
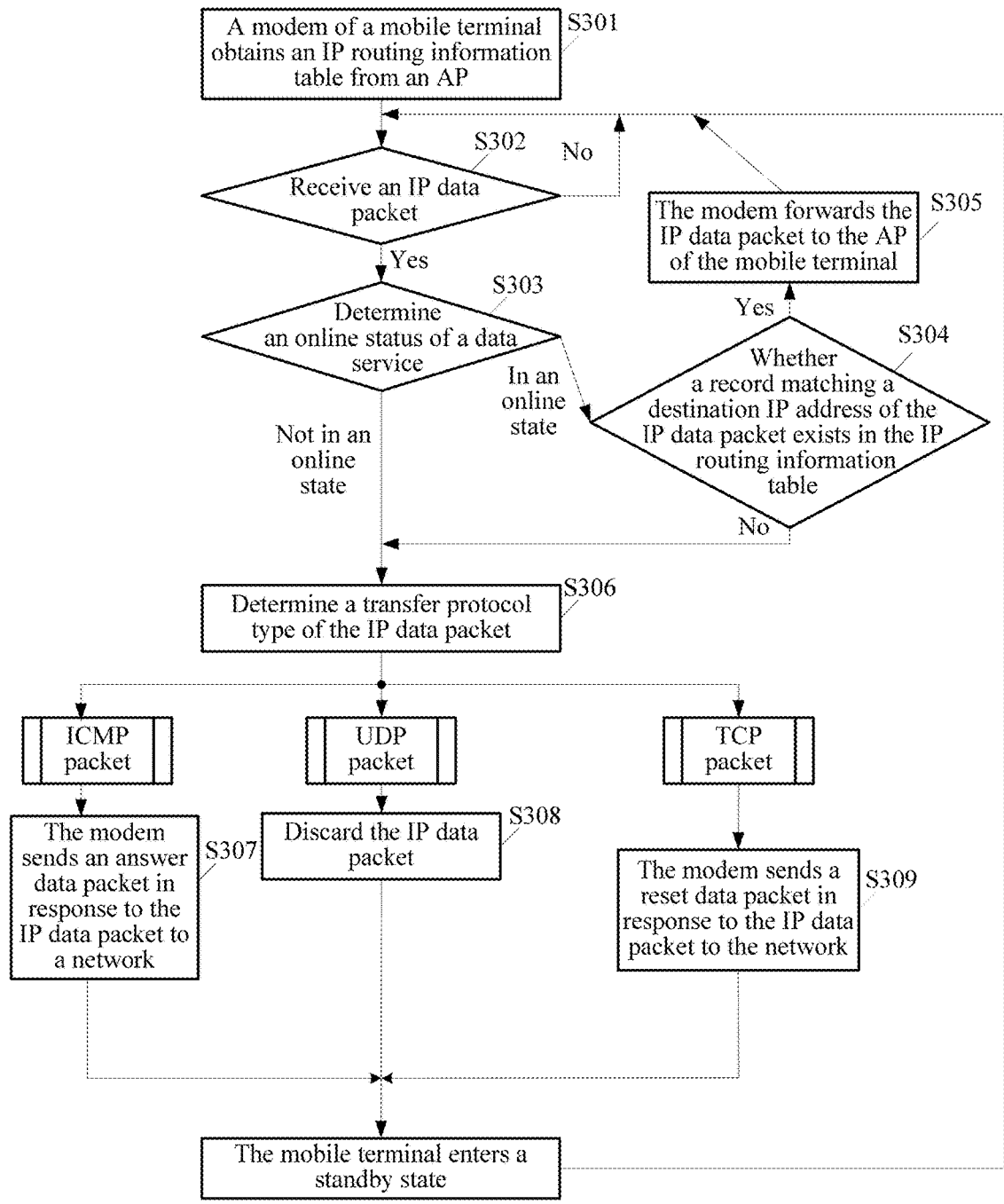
FIG. 3 is a schematic flowchart of another data packet processing method according to an embodiment of the present disclosure.

Referring to FIG. 3, FIG. 3 is a schematic flowchart of another data packet processing method according to another embodiment of the present disclosure. As illustrated in FIG. 3, another data packet processing method provided by another embodiment of the present disclosure may include the following.

S301, A modem of a mobile terminal obtains an IP routing information table from an AP, where the IP routing information table includes some or all local IP addresses of the mobile terminal.

S302, The modem of the mobile terminal receives an IP data packet from a network.

S303, The modem of the mobile terminal determines an online status of a data service of the mobile terminal.

Step S304 is performed if it is determined that the data service of the mobile terminal is in an online state.

Step S306 is performed if it is determined that the data service of the mobile terminal is not in the online state.

For example, if a PDP context of the mobile terminal is in an activated state and the mobile terminal has an EPS Bearer, it is considered that the data service of the mobile terminal is in the online state, and if the mobile terminal does not have an EPS Bearer, it can be considered that the data service of the mobile terminal is not in the online state.

S304, The modem of the mobile terminal searches the IP routing information table to determine whether a record matching a destination IP address of the received IP data packet exists (that is, whether the destination IP address of the IP data packet is the same as one of local IP addresses of the mobile terminal).

If yes, step S305 is performed.

If no, step S306 is performed.

S305, The modem of the mobile terminal forwards the IP data packet to the AP of the mobile terminal.

If a record matching the destination IP address of the received IP data packet is found in the IP routing information table (that is, the destination IP address of the IP data packet is the same as one of the local IP addresses of the mobile terminal), it can be considered that the IP data packet is a normal data service flow.

If no record matching the destination IP address of the received IP data packet is found in the IP routing information table (that is, the destination IP address of the IP data packet is different from any one of the local IP addresses of the mobile terminal), it can be considered that the IP data packet may be an abnormal data service flow.

S306, The modem of the mobile terminal determines a transfer protocol type of the IP data packet.

Step S307 is performed if it is determined that the transfer protocol type of the IP data packet is an ICMP.

Step S308 is performed if it is determined that the transfer protocol type of the IP data packet is a UDP.

Step S309 is performed if it is determined that the transfer protocol type of the IP data packet is a TCP.

S307, The modem of the mobile terminal sends an answer data packet in response to the IP data packet to the network.

S308, The modem of the mobile terminal discards the IP data packet.

S309, The modem of the mobile terminal sends a RST data packet in response to the IP data packet to the network.

Optionally, in some possible implementation manners of the present disclosure, if it is determined that the data service of the mobile terminal is not in the online state, the modem controls the mobile terminal to enter a standby state after processing the IP data packet according to the transfer protocol type of the IP data packet. If the data service of the mobile terminal is not in the online state, the mobile terminal is triggered by a rubbish packet (the IP data packet) to enter a connected state, and in this case, the mobile terminal may be controlled to enter a standby state without waiting for network timeout. This also helps further reduce standby power consumption of the mobile terminal.

It can be learned that in the technical solution of this embodiment, when receiving an Internet Protocol IP data packet from a network, a modem of a mobile terminal determines an online status of a data service of the mobile terminal. If it is determined that the data service of the mobile terminal is not in an online state, the modem processes the IP data packet according to a transfer protocol type of the IP data packet. Besides, because if it is determined that the data service of the mobile terminal is not in the online state, the modem does not forward the IP data packet to an application processor of the mobile terminal, some IP data packets invalid for the application processor can be blocked by the modem. This can greatly reduce a probability that the application processor of the mobile terminal is awakened for no reason after the data service is disconnected, and helps greatly reduce processing of invalid IP data packets by the application processor, thereby helping reduce standby power consumption of the mobile terminal and further improving product experience of users.

Figure 4:
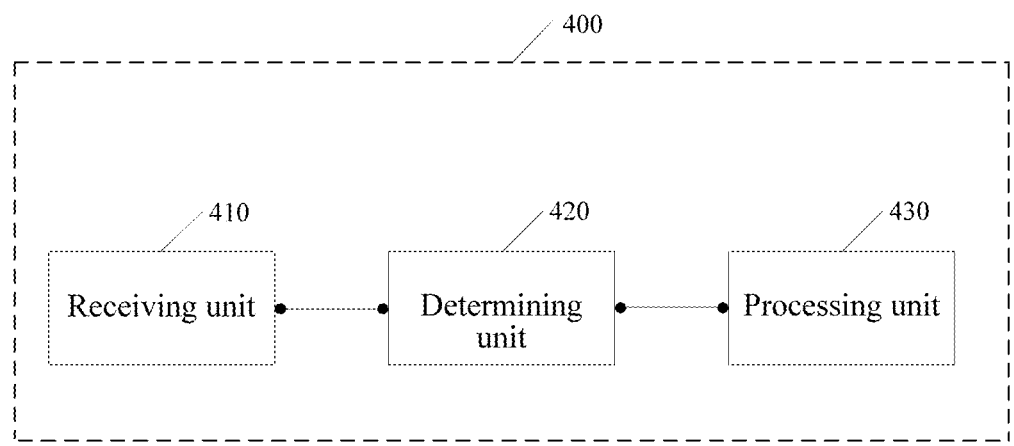
FIG. 4 is a schematic diagram of a modem of a mobile terminal according to an embodiment of the present disclosure.

Referring to FIG. 4, an embodiment of the present disclosure further provides a modem 400 of a mobile terminal, including a receiving unit 410, a determining unit 420, and a processing unit 430.

The receiving unit 410 is configured to receive an IP data packet from a network.

The determining unit 420 is configured to determine an online status of a data service of the mobile terminal.

The processing unit 430 is configured to process the IP data packet according to a transfer protocol type of the IP data packet if it is determined that the data service of the mobile terminal is not in an online state, where the processing unit does not forward the IP data packet to an application processor of the mobile terminal if the data service of the mobile terminal is not in the online state.

Optionally, in some possible implementation manners of the present disclosure, the processing unit 430 is further configured to detect whether a destination IP address of the IP data packet is the same as one of local IP addresses of the mobile terminal if it is determined that the data service of the mobile terminal is in the online state; and process the IP data packet according to the transfer protocol type of the IP data packet if it is detected that the destination IP address of the IP data packet is different from any one of the local IP addresses of the mobile terminal, where the processing unit does not forward the IP data packet to the application processor of the mobile terminal if it is detected that the destination IP address of the IP data packet is different from any one of the local IP addresses of the mobile terminal.

Optionally, in some possible implementation manners of the present disclosure, the processing unit 430 is further configured to forward the IP data packet to the application processor of the mobile terminal if it is detected that the destination IP address of the IP data packet is the same as one of the local IP addresses of the mobile terminal.

Optionally, in some possible implementation manners of the present disclosure, in terms of processing the IP data packet according to the transfer protocol type of the IP data packet, the processing unit 430 is configured to send a reset data packet in response to the IP data packet to the network if the transfer protocol type of the IP data packet is a Transmission Control Protocol TCP.

Optionally, in some possible implementation manners of the present disclosure, in terms of processing the IP data packet according to the transfer protocol type of the IP data packet, the processing unit 430 is configured to use the destination IP address of the IP data packet as an IP address of a virtual network interface card in the modem, where a port list of the virtual network interface card does not include a port record matching the destination IP address; and input the IP data packet to a TCP/IP protocol stack of the virtual network interface card, to trigger the protocol stack of the virtual network interface card to send, after receiving the IP data packet, the reset data packet in response to the IP data packet to the network.

Optionally, in some possible implementation manners of the present disclosure, the port list of the virtual network interface card is an empty port list.

Optionally, in some possible implementation manners of the present disclosure, in terms of processing the IP data packet according to the transfer protocol type of the IP data packet, the processing unit 430 is configured to discard, by the modem, the IP data packet if the transfer protocol type of the IP data packet is a user datagram protocol UDP.

Optionally, in some possible implementation manners of the present disclosure, in terms of processing the IP data packet according to the transfer protocol type of the IP data packet, the processing unit 430 is configured to send an answer data packet of the IP data packet to the network if the transfer protocol type of the IP data packet is an Internet Control Message Protocol ICMP.

It can be understood that functions of functional modules of the modem 400 of this embodiment may be implemented according to the method in the foregoing method embodiment. Refer to related descriptions of the foregoing method embodiment for an implementation process thereof. Details are not described herein.

It can be known that in the technical solution of this embodiment, when receiving an Internet Protocol IP data packet from a network, the modem 400 of a mobile terminal determines an online status of a data service of the mobile terminal. If it is determined that the data service of the mobile terminal is not in an online state, the modem processes the IP data packet according to a transfer protocol type of the IP data packet. Besides, because if it is determined that the data service of the mobile terminal is not in the online state, the modem does not forward the IP data packet to an application processor of the mobile terminal, some IP data packets invalid for the application processor can be blocked by the modem. This can greatly reduce a probability that the application processor of the mobile terminal is awakened for no reason after the data service is disconnected, and helps greatly reduce processing of invalid IP data packets (which may also be referred to as rubbish IP data packets) by the application processor, thereby helping reduce standby power consumption of the mobile terminal and further improving product experience of users.

Figure 5:
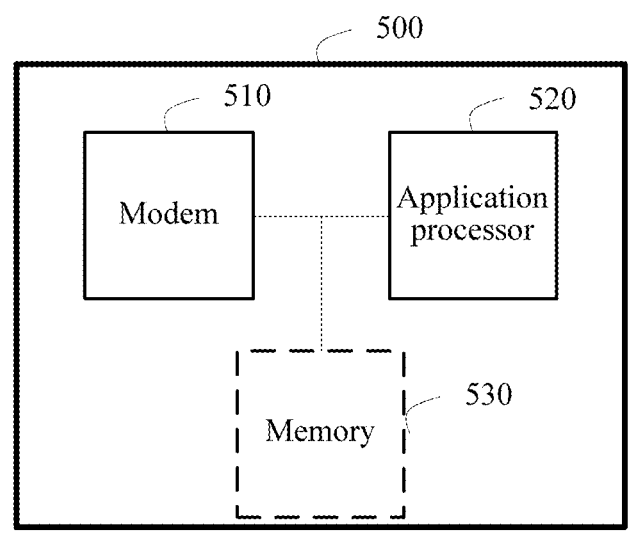
FIG. 5 is a schematic diagram of a mobile terminal according to an embodiment of the present disclosure.

Referring to FIG. 5, an embodiment of the present disclosure further provides a mobile terminal 500, including a modem 510 and an application processor 520; optionally, the mobile terminal 500 may further include a memory 530 and the like.

The modem 510 is configured to receive an Internet Protocol IP data packet from a network; determine an online status of a data service of the mobile terminal 500; and process the IP data packet according to a transfer protocol type of the IP data packet if it is determined that the data service of the mobile terminal is not in an online state, where the modem 510 does not forward the IP data packet to the application processor 520 if it is determined that the data service of the mobile terminal is not in the online state.

Optionally, in some possible implementation manners of the present disclosure, the modem is further configured to detect whether a destination IP address of the IP data packet is the same as one of local IP addresses of the mobile terminal if it is determined that the data service of the mobile terminal is in the online state; and process the IP data packet according to the transfer protocol type of the IP data packet if it is detected that the destination IP address of the IP data packet is different from any one of the local IP addresses of the mobile terminal, where the modem does not forward the IP data packet to the application processor of the mobile terminal if it is detected that the destination IP address of the IP data packet is different from any one of the local IP addresses of the mobile terminal.

Optionally, in some possible implementation manners of the present disclosure, the modem is further configured to forward the IP data packet to the application processor of the mobile terminal if it is detected that the destination IP address of the IP data packet is the same as one of the local IP addresses of the mobile terminal.

Optionally, in some possible implementation manners of the present disclosure, in terms of processing the IP data packet according to the transfer protocol type of the IP data packet, the modem is configured to send a reset data packet in response to the IP data packet to the network if the transfer protocol type of the IP data packet is a Transmission Control Protocol TCP.

Optionally, in some possible implementation manners of the present disclosure, in terms of processing the IP data packet according to the transfer protocol type of the IP data packet, the processing unit is configured to use the destination IP address of the IP data packet as an IP address of a virtual network interface card in the modem, where a port list of the virtual network interface card does not include a port record matching the destination IP address; and input the IP data packet to a TCP/IP protocol stack of the virtual network interface card, to trigger the protocol stack of the virtual network interface card to send, after receiving the IP data packet, the reset data packet in response to the IP data packet to the network.

Optionally, in some possible implementation manners of the present disclosure, the port list of the virtual network interface card is an empty port list.

Optionally, in some possible implementation manners of the present disclosure, in terms of processing the IP data packet according to the transfer protocol type of the IP data packet, the modem is configured to discard the IP data packet if the transfer protocol type of the IP data packet is a user datagram protocol UDP.

Optionally, in some possible implementation manners of the present disclosure, in terms of processing the IP data packet according to the transfer protocol type of the IP data packet, the modem is configured to send an answer data packet of the IP data packet to the network if the transfer protocol type of the IP data packet is an Internet Control Message Protocol ICMP.

Optionally, in some possible implementation manners of the present disclosure, if it is determined that the data service of the mobile terminal is not in the online state, the modem is further configured to control the mobile terminal to enter a standby state after processing the IP data packet according to the transfer protocol type of the IP data packet.

Optionally, in some possible implementation manners of the present disclosure, the mobile terminal is a mobile terminal supporting a Long Term Evolution LTE standard.

It can be understood that functions of functional modules of the mobile terminal 500 of this embodiment may be implemented according to the method in the foregoing method embodiment. Refer to related descriptions of the foregoing method embodiment for an implementation process thereof. Details are not described herein.

It can be learned that in the technical solution of this embodiment, when receiving an Internet Protocol IP data packet from a network, the modem 510 of the mobile terminal 500 determines an online status of a data service of the mobile terminal. If it is determined that the data service of the mobile terminal is not in an online state, the modem processes the IP data packet according to a transfer protocol type of the IP data packet. Besides, because if it is determined that the data service of the mobile terminal is not in the online state, the modem does not forward the IP data packet to an application processor of the mobile terminal, some IP data packets invalid for the application processor can be blocked by the modem 510. This can greatly reduce a probability that the application processor of the mobile terminal is awakened for no reason after the data service is disconnected, and helps greatly reduce processing of invalid IP data packets (which may also be referred to as rubbish IP data packets) by the application processor 520, thereby helping reduce standby power consumption of the mobile terminal and further improving product experience of users.

In the foregoing embodiments, the description of each embodiment has respective focuses. For a part that is not described in detail in an embodiment, reference may be made to related descriptions in other embodiments.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are exemplary embodiments, and the related actions and modules are not necessarily mandatory to all embodiments of the present disclosure.

In the several embodiments provided in the present application, it should be understood that the disclosed apparatus may be implemented in other manners. For example, the described apparatus embodiment is merely exemplary. For example, the unit division is merely logical function division and may be other division in an implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present disclosure may be implemented in the form of a software product. The software product is stored in a storage medium and includes several instructions for instructing a computer device (which may be a personal computer, a server, or a network device, and may be a processor in a computer device) to perform all or a part of the steps of the foregoing methods described in the embodiments of the present disclosure. The foregoing storage medium includes any medium that can store program code, such as a USB flash drive, a removable hard disk, a magnetic disk, an optical disc, a read-only memory (ROM), or a random access memory (RAM).

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A data packet processing method, comprising:
   receiving, by a modem of a mobile terminal, an Internet Protocol (IP) data packet from a network;
   determining an online status of a data service of the mobile terminal;
   processing, by the modem, the IP data packet based on a transfer protocol type of the IP data packet when it is determined that the data service of the mobile terminal is not in an online state, wherein the modem does not forward the IP data packet to an application processor of the mobile terminal when it is determined that the data service of the mobile terminal is not in the online state;
   detecting, by the modem, whether a destination IP address of the IP data packet is the same as one of a plurality of local IP addresses of the mobile terminal when it is determined that the data service of the mobile terminal is in the online state; and
   processing, by the modem, the IP data packet based on the transfer protocol type of the IP data packet when it is detected that the destination IP address of the IP data packet is different from any one of the plurality of local IP addresses of the mobile terminal, wherein the modem does not forward the IP data packet to the application processor of the mobile terminal when it is detected that the destination IP address of the IP data packet is different from any one of the plurality of local IP addresses of the mobile terminal.

2. The method of claim 1, wherein the method further comprises forwarding, by the modem, the IP data packet to the application processor of the mobile terminal when it is detected that the destination IP address of the IP data packet is the same as one of the plurality of local IP addresses of the mobile terminal.

3. The method of claim 1, wherein processing the IP data packet comprises sending, by the modem, a reset data packet in response to the IP data packet to the network when the transfer protocol type of the IP data packet is a Transmission Control Protocol (TCP).

4. The method of claim 1, wherein processing the IP data packet comprises sending, by the modem, a reset data packet in response to the IP data packet to the network when the transfer protocol type of the IP data packet is a Transmission Control Protocol (TCP).

5. The method of claim 3, wherein sending the reset data packet comprises:
   using, by the modem, the destination IP address of the IP data packet as an IP address of a virtual network interface card in the modem, wherein a port list of the virtual network interface card does not comprise a port record matching the destination IP address; and
   inputting, by the modem, the IP data packet to a TCP/IP protocol stack of the virtual network interface card to trigger the protocol stack of the virtual network interface card to send the reset data packet.

6. The method of claim 5, wherein the port list of the virtual network interface card is an empty port list.

7. The method of claim 1, wherein processing the IP data packet comprises discarding, by the modem, the IP data packet when the transfer protocol type of the IP data packet is a user datagram protocol (UDP).

8. The method of claim 1, wherein processing the IP data packet comprises sending, by the modem, an answer data packet of the IP data packet to the network when the transfer protocol type of the IP data packet is an Internet Control Message Protocol (ICMP).

9. The method of claim 1 further comprising controlling, by the modem, the mobile terminal to enter a standby state after processing the IP data packet based on the transfer protocol type of the IP data packet when it is determined that the data service of the mobile terminal is not in the online state.

10. The method of claim 1, wherein the mobile terminal is a mobile terminal supporting a Long Term Evolution (LTE) standard.

11. A mobile terminal, comprising:
a memory configured to store an instruction;
an application processor; and
a modem coupled to the memory, the modem configured to:
   receive an Internet Protocol (IP) data packet from a network;
   determine an online status of a data service of the mobile terminal;
   process the IP data packet based on a transfer protocol type of the IP data packet when it is determined that the data service of the mobile terminal is not in an online state, wherein the modem does not forward the IP data packet to the application processor when it is determined that the data service of the mobile terminal is not in the online state;
   detect whether a destination IP address of the IP data packet is the same as one of a plurality of local IP addresses of the mobile terminal when it is determined that the data service of the mobile terminal is in the online state; and
   process the IP data packet based on the transfer protocol type of the IP data packet when it is detected that the destination IP address of the IP data packet is different from any one of the plurality of local IP addresses of the mobile terminal, wherein the modem does not forward the IP data packet to the application processor of the mobile terminal when it is detected that the destination IP address of the IP data packet is different from any one of the plurality of local IP addresses of the mobile terminal.

12. The mobile terminal of claim 11, wherein the modem is further configured to forward the IP data packet to the application processor of the mobile terminal when it is detected that the destination IP address of the IP data packet is the same as one of the plurality of local IP addresses of the mobile terminal.

13. The mobile terminal of claim 11, wherein the modem configured to process the IP data packet comprises the modem further configured to send a reset data packet in response to the IP data packet to the network when the transfer protocol type of the IP data packet is a Transmission Control Protocol (TCP).

14. The mobile terminal of claim 11, wherein the modem configured to process the IP data packet comprises the modem further configured to discard the IP data packet when the transfer protocol type of the IP data packet is a user datagram protocol (UDP).

15. The mobile terminal of claim 11, wherein the modem configured to process the IP data packet comprises the modem further configured to send an answer data packet of the IP data packet to the network when the transfer protocol type of the IP data packet is an Internet Control Message Protocol (ICMP).

16. The mobile terminal of claim 11, wherein the modem is further configured to control the mobile terminal to enter a standby state after processing the IP data packet when it is determined that the data service of the mobile terminal is not in the online state.

17. The mobile terminal of claim 11, wherein the mobile terminal is a mobile terminal supporting a Long Term Evolution (LTE) standard.

18. A nonvolatile non-transitory computer readable storage medium comprising one or more programs which when executed by a mobile terminal comprising a modem and an application processor, cause the mobile terminal to:
   receive an Internet Protocol (IP) data packet from a network;
   determine an online status of a data service of the mobile terminal;
   process the IP data packet based on a transfer protocol type of the IP data packet when it is determined that the data service of the mobile terminal is not in an online state, wherein the modem does not forward the IP data packet to the application processor when it is determined that the data service of the mobile terminal is not in the online state;
   detect whether a destination IP address of the IP data packet is the same as one of a plurality of local IP addresses of the mobile terminal when it is determined that the data service of the mobile terminal is in the online state; and
   process the IP data packet based on the transfer protocol type of the IP data packet when it is detected that the destination IP address of the IP data packet is different from any one of the plurality of local IP addresses of the mobile terminal, wherein the modem does not forward the IP data packet to the application processor of the mobile terminal when it is detected that the destination IP address of the IP data packet is different from any one of the plurality of local IP addresses of the mobile terminal.

* * * * *